June 20, 1967 F. P. PASHENEE 3,326,599
ROOF CONSTRUCTION FOR A MOTOR VEHICLE
Filed April 26, 1965 2 Sheets-Sheet 1

INVENTOR.
FRANCIS P. PASHENEE
BY Whittemore, Hulbert & Belknap
ATTORNEYS

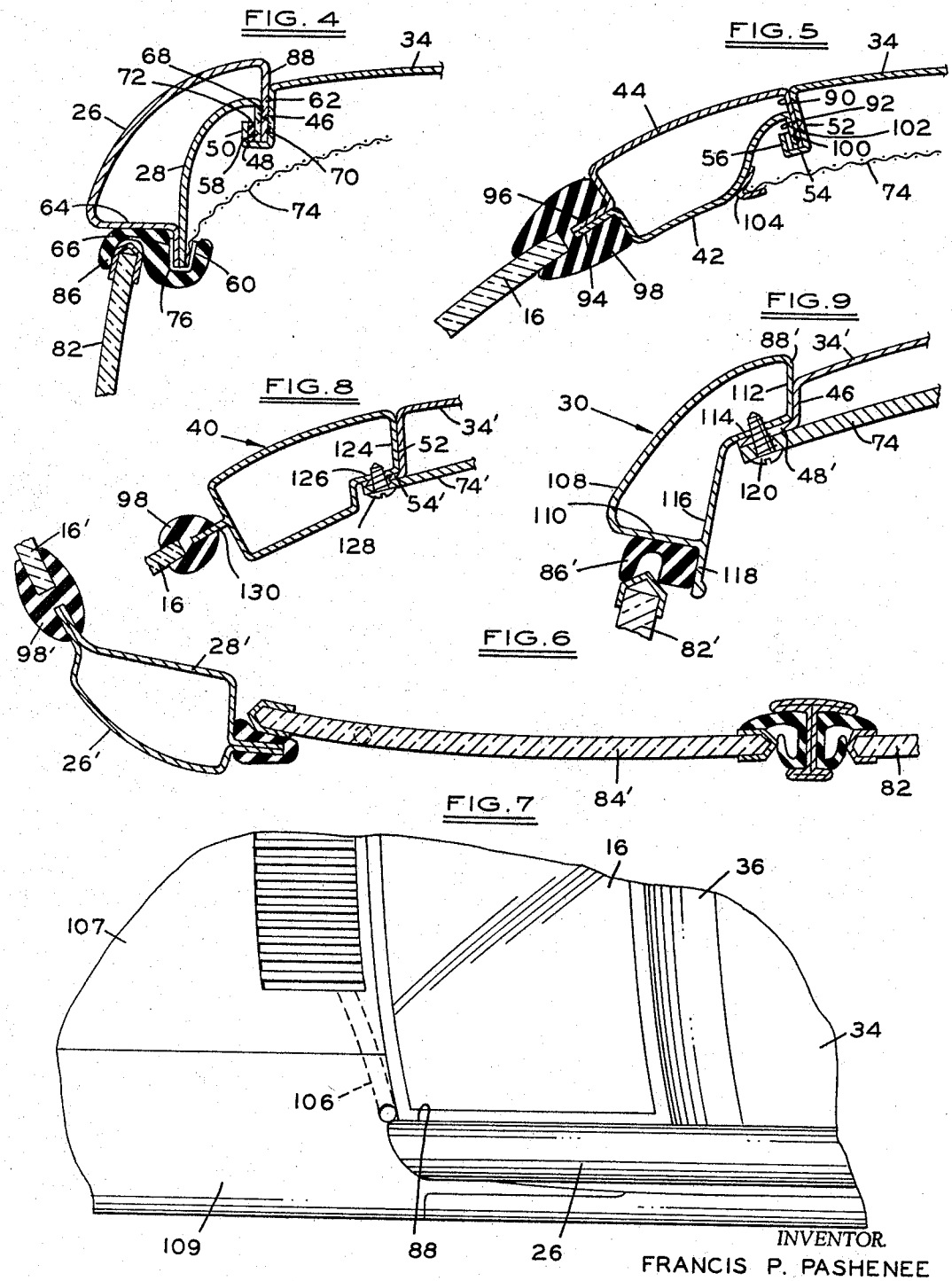

United States Patent Office 3,326,599
Patented June 20, 1967

3,326,599
ROOF CONSTRUCTION FOR A MOTOR VEHICLE
Francis P. Pashenee, 3395 Peppermill,
Attica, Mich. 48412
Filed Apr. 26, 1965, Ser. No. 450,774
7 Claims. (Cl. 296—137)

This invention relates to a motor vehicle and more particularly to a novel body and roof construction therefor. The prior art illustrates various motor vehicles having complicated body and roof designs. The roof constructions include side struts therefor each of which are generally manufactured in two or more pieces resulting in not only manufacturing difficulties but also assembly problems when applying the side strut pieces to the body. In addition, the prior art motor vehicles include drip moldings adjacent the side struts which extend around the doors and windows of the vehicle body. The drip moldings are separate elements in addition to the various inner and outer roof supporting rails or struts.

The present invention relates particularly to a novel roof design wherein each of the outer side rails or side struts form an exterior part of the roof. With such a construction the conventional drip moldings are eliminated thereby also eliminating the dies and fixtures necessary to manufacture the drip moldings. By eliminating the drip moldings or the elements performing the single function of drip moldings, I have simplified the design and construction of the roof panel and in addition thereto have saved additional and valuable passenger space in the body of the vehicle.

In modern day automobiles the trend in style is to provide a relatively low vehicle having a swept back type of body construction without sacrificing passenger space. The present invention provides additional passenger space by eliminating certain structural elements and drip moldings. The roof construction permits more flexibility in the engineering and design of the vehicle body. The roof construction insures the highest possible standards of safety at economical costs.

It is an object of the present invention to provide a roof construction for the body of a motor vehicle comprising a generally rectangular slightly curved substantially horizontal roof panel having at each of the four edges thereof a downwardly extending flange, generally tubular struts opposite the edges of the roof panel, each of said struts including a wall portion in superimposed abutting relationship with a corresponding flange on the roof panel, and means for securing each corresponding flange and wall portion together.

Another object of the present invention is to provide a roof construction of the aforementioned type wherein the securing means is in the form of a weld.

Still another object of the present invention is to provide a roof construction of the aforementioned type wherein the securing means is in the form of threaded fasteners.

A further object of the present invention is to provide a roof construction of the aforementioned type wherein the outer surfaces of the tubular struts at the side edges of the roof panel extend upwardly beyond the top surface of the roof panel so as to form a barrier which generally prevents rain water from falling off the roof transversely thereof.

A still further object of the present invention is to provide a roof structure of the aforementioned type wherein the top surfaces of the outer struts at the front and rear edges of the roof panel are substantially flush with the top surface of the roof panel to permit rain water from the roof panel to escape.

Another object of the present invention is to provide a body for a motor vehicle comprising upper and lower portions enclosing the passenger space of the vehicle, said portions including side doors and a roof panel, a pair of laterally spaced side struts located generally in vertical planes, each of the side struts extending from the intersection of the upper and lower portions at the front of and at one side of the vehicle in a generally upwardly and then rearwardly direction towards the rear of the vehicle and finally in a generally downwardly direction to the intersection of the upper and lower portions at the rear of the vehicle, said roof panel being generally rectangular and slightly curved in the longitudinal and transverse directions, each edge of the roof panel having a downwardly extending flange, front and rear transversely extending struts connecting portions of the side struts intermediate the ends thereof, said side, front and rear struts each having a wall portion in contact with the corresponding flange on the roof panel, means for securing the flanges and wall portions together, the outer surfaces of the struts at the side edges of the roof panel extending upwardly beyond the top surface of the roof panel to form barriers which generally prevents rain water from falling off the roof transversely thereof, and the top surfaces of the front and rear struts being substantially flush with the top surface of the roof panel to permit rain water from the roof panel to escape.

Still another object of the present invention is to provide a body of the aforementioned type wherein each of the struts is in the form of an integral one-piece tubular extruded metal member which is secured to the corresponding flange of the roof panel by threaded fasteners.

A further object of the present invention is to provide a body of the aforementioned type wherein each of the struts is in the form of a two-piece construction having an outer rail overlying an inner rail, with each of the rails having a flange in superimposed relationship with the corresponding flange of the roof panel and secured thereto by welds.

It is thus another object of the present invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

FIGURE 4 is a fragmentary transverse sectional view through a side roof strut, the roof panel and the door assembly looking in the direction of arrows 4—4 of FIGURE 1.

FIGURE 5 is a typical transverse sectional view through the front roof strut taken on the line 5—5 of FIGURE 3.

FIGURE 6 is a fragmentary sectional view taken on the line 6—6 of FIGURE 3 and illustrating the vent window as part of the front windshield assembly.

FIGURE 7 is a fragmentary plan view of the vehicle illustrated in FIGURE 3 and showing in particular the area around the front end of one of the side struts.

FIGURE 8 is a transverse sectional view similar to FIGURE 5 and illustrating a modified form of front roof strut.

FIGURE 9 is a transverse sectional view similar to FIGURE 4 and illustrating a modified form of side strut.

The present invention is primarily adaptable for an automotive vehicle which may best be defined as a self-moving device for the transportation of persons, equipment or goods over land. Thus, the term "automotive vehicle" includes all self-propelled vehicles including passenger cars, trucks, etc. In particular when discussing an automotive vehicle, I am referring to the type of vehicle powered by an internal combustion, gasoline type engine although it should be appreciated that other types of engines may be utilized. As an example, diesel engines are utilized successfully with trucks. Regardless of the type of engine employed an automotive vehicle is a vehicle which has an engine for producing its own power.

Figure 1:
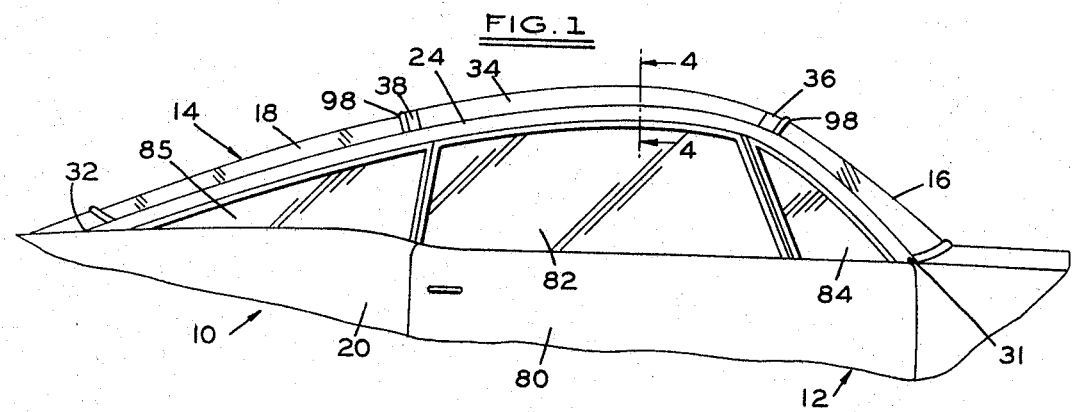
FIGURE 1 is a fragmentary side elevation of a vehicle body.
Figure 2:
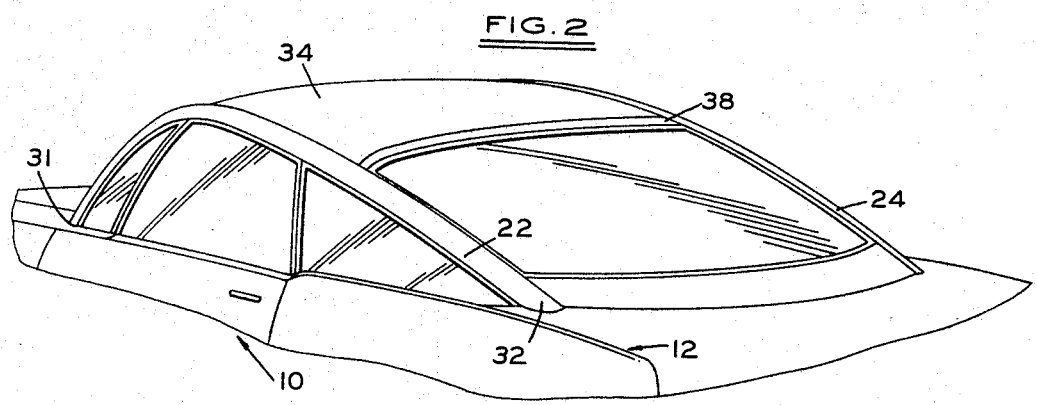
FIGURE 2 is a fragmentary perspective view of the vehicle body illustrated in FIGURE 1 looking in a direction so as to illustrate the driver side and rear of the vehicle body.

Referring now to the drawings, an automotive passenger vehicle is illustrated in FIGURES 1 and 2 and is designated by the numeral 10. The vehicle 10 includes the usual engine and power train, not shown, steering assembly including the ground engaging wheels, not shown, etc., as are conventionally employed in modern day automobiles.

Heretofore various complicated dies and fixtures have been required to manufacture the roof panels, side rails or struts, drip moldings and the like. The present invention has simplified the manufacture of the roof construction and has eliminated the drip moldings thereby resulting in a considreable savings in time and material.

The vehicle 10 includes the usual frame which is made of heavy steel channels thoroughly braced and reinforced. The closed body 12 is mounted on the frame and is secured thereto by bolts. The closed body 12 is intended to carry the driver and the passengers or cargo. The body 12 includes an upper portion 14, which is defined as that part of the vehicle body 12 extending above an imaginary horizontal plane connecting the lower edges of the front windshield 16 and the back window 18, and a lower portion 20 of the body which is defined as that part below the aforesaid imaginary horizontal plane.

The upper portion of the body 12 is provided with a pair of tubular-like side struts 22 and 24 generally of identical construction. Each of the side struts 22 and 24 may be in the form of outer and inner rails 26 and 28 respectively of the type illustrated in FIGURE 4 or a one-piece integral member 30 of the type illustrated in FIGURE 9 as will be explained in detail later in the specification. In either case it should be noted that the struts 22 and 24 extend in an upwardly and rearwardly direction starting at the front of the vehicle at the intersection of the upper and lower portions 14 and 20 respectively as indicated by the numeral 31 and then generally rearwardly and finally downwardly to the intersection of the upper and lower portions 14 and 20 respectively at the rear of the vehicle as indicated by the numeral 32 in FIGURE 1.

The vehicle 10 also includes a generally horizontal roof panel 34 which is curved slightly in longitudinal and transverse directions. At the front and rear edges of the roof panel 34 are provided a front strut 36 and a rear strut 38 respectively. The front and rear struts 36 and 38 are of generally identical construction and may each take the form of an integral one-piece extruded metal element 40 of the type indicated in FIGURE 8 or may take the form of a two-piece unit consisting of an inner rail 42 and outer rail 44 as illustrated in FIGURE 5.

The substantially horizontal generally rectangular roof panel 34 is provided on each of the side edges thereof with a downwardly extending flange 46 as best illustrated in FIGURE 4. The terminal end of the flange 46 is provided with a laterally outwardly extending element 48 the outer end of which is provided with an upwardly extending element 50. Thus the flange 46 and elements 48 and 50 form a trough or channel of generally U-shaped cross section.

The front and rear edges of the roof panel 34 as illustrated in FIGURE 5 are each provided with a downwardly extending flange 52. The terminal end of the flange 52 is provided with a laterally outwardly extending element 54 the outer end of which is provided with an upwardly extending element 56. Thus, the flange 52 and elements 54 and 56 form a trough or channel of U-shaped cross section similar to the trough or channel provided on each side flange 46.

The inner rail 28 is provided on the upper end thereof with a downwardly extending flange 58 while the lower end thereof terminates in a flange 60. The outer rail 26 is in the form of an arcuate section having a downwardly extending flange 62 on the upper edge thereof and a laterally turned flange 64 on the lower edge thereof which in turn is provided with a downwardly extending flange 66. The inner and outer rails 28 and 26 are each formed in one piece generally from a metal or a suitable metal alloy. The rails 26 and 28 are precut to a length which will extend between the points 31 and 32 discussed previously. Each element or flange of each rail extend generally the entire length thereof.

In assembling the inner and outer rails 28 and 26 respectively with the roof panel 34, the flanges 58 and 62 of the inner rail 28 and outer rail 26 respectively are brought into superimposed assembled relationship and inserted in the U shaped trough carried by the flange 46 as best illustrated in FIGURE 4 so that the flange 62 of the outer rail 26 is in surface-to-surface contact with the side roof flange 46. Prior thereto the flanges 58 and 62 of the inner and outer rails are welded together as indicated by the weld 68. After assembly, the flange 62 of the outer rail 26 is welded to the side roof flange 46 as indicated by the weld 70. It should be appreciated that prior to welding the inner and outer rails in the manner just described a sealing element or sealer 72 of suitable resilient material such as rubber is interposed between the flange 58 of the inner rail 28 and the leg or element 50. It should also be appreciated that the transversely extending element 48 not only helps to locate the sealing element 72 in proper position but also serves as a means for locating the inner and outer rails 28 and 26 in proper position with respect to the roof panel 34. In effect, the element 48 serves as a stop against which the terminal ends of the flanges 58 and 62 abut.

The interior of the motor vehicle 10 is provided with a head lining or liner 74 made from suitable fabric material. Each side edge of the fabric 74 as well as the corresponding flanges 60 and 66 of the inner rail 28 and outer rail 26 respectively are received in a substantially U-shaped element 76 and are appropriately secured thereto by welding or tacking or by other suitable means well known in the art.

The closed body 12 is provided with side doors 80 each of which carry the usual window 82 and vent window 84 adjacent the front half of the vehicle body. Extending around the door 80 and the rear side window 85 below the flange 64 of the outer rail 26 is a weatherstrip 86 (FIGURE 4) which is appropriately connected to the flange 64 or the U-shaped element 76 as is well known in the art.

It should be noted that no drip moldings are utilized in the present invention as is clearly indicated by reference to FIGURE 4. However, the outer rail 26 which forms a structural part of the vehicle body is constructed and arranged so that the upper part of the flange 62, as indicated by the numeral 88, extends above the top surface of the roof panel 34 so as to form a barrier or lip which will prevent water from falling off the roof panel 34 transversely thereof. In other words, the lip or barrier 86 will direct water towards the front and rear of the vehicle depending on the curvature of the roof so that the water may fall or escape from the roof as is conventional with modern day automobiles.

FIGURE 5 illustrates the manner in which the inner front or rear rail 42 and outer front or rear rail 44 are connected to the front or rear edges of the roof panel 34. The outer rail 44 is provided with a downwardly extending flange 90 while the inner rail 42 has a downwardly extending flange 92 which engages the flange 90 as best illustrated in FIGURE 5 and is seam welded thereto. The other ends of the rails 42 and 44 are provided with outwardly turned flanges 94 and 96 respectively which are appropriately secured together by seam welding and form an abutment for carrying suitable weatherstripping 98 for the windshield 16.

The flanges 92 and 90 of the inner rail and outer rails 42 and 44 respectively are seam welded as indicated by the numeral 100 and after assembly the flange 90 is seam welded to the flange 52 of the roof panel 34 as indicated by the numeral 102. The inner rail 42 intermediate the ends thereof is provided on the inner side thereof with a U-shaped element 104 to which is appropriately secured the head lining or liner 74.

It should be noted that the outer surface of the outer rail 44 is substantially flush or even with the outer surface of the roof 34. With such a construction the rain water will flow off the roof panel 34 across the outer rail 44 and onto the windshield 16 or the back window 18 as the case may be without any obstruction. In addition, the water which is channeled by the lips or barriers 88 located at both longitudinal edges of the roof is directed along the side edges of the vehicle body across the windshield 16 into a tubular hose or conduit 106. The hose 106 which may be made from rubber or a suitable plastic material extends through the hood 107 or fender panel 109 of the vehicle body into the cavity underneath the hood. The water from the hose 106 escapes to the ground or to a suitable receptacle which in turn is connected or opened to the ground.

Figure 3:
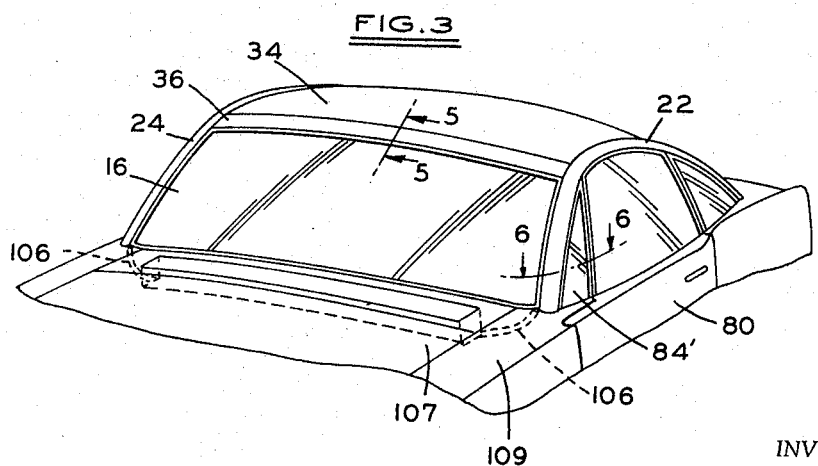
FIGURE 3 is a fragmentary perspective view of a modified vehicle body, looking at the front and driver side of the vehicle, illustrating the vent window on the driver's side of the vehicle which is carried by the front windshield assembly rather than by the door assembly as is illustrated in FIGURES 1 and 2.

FIGURE 3 is similar in construction to FIGURES 1 and 2 with the exception that the vent window panel 84' is formed as part of the front windshield assembly 16 rather than as part of the door 80 as in FIGURES 1 and 2.

The embodiment illustrated in FIGURES 8 and 9 can be used with any motor vehicle such as those illustrated in FIGURES 1–3 inclusive. The embodiment in FIGURES 8 and 9 have certain advantages over the roof construction illustrated in FIGURES 4 and 5 as will be readily apparent from the following description. Where applicable, the same numerical designation will be utilized to designate similar parts but with a prime (') designation affixed thereto.

The roof panel 34' has on each of the side edges thereof a downwardly extending flange 46' terminating in an outwardly extending element or flange 48'. The tubular strut 30 is formed as one integral tubular piece or member by extruding metal such as aluminum, an aluminum alloy or other suitable metal or metal alloy which has sufficient strength to perform the required supporting functions.

The strut 30 includes various pronounced segments or portions including the outer curved wall portion 108, the upper end of which is connected to the inner wall portion consisting of pronounced segments 112, 114 and 116. The lower end of the outer curved wall portion 108 is connected to the wall portion 116 by the bridge portion 110 at a point intermediate the ends thereof. The wall portion 116 terminates in a flange portion 118 below the bridge portion 110 as best illustrated in FIGURE 9. Each side edge of the head lining 74' is brought in contact with the corresponding side flange 48' of the roof panel 34' after which time a plurality of longitudinally spaced threaded fasteners 120 are threaded through the head liner 74', roof flange 48' and the inner wall portion or segment 114 of the tubular strut 30 so as to connect the various component parts together in assembled relationship. It has been found that with the construction just described no sealing element is required between the flange portions 48 and 114 as in the other embodiment. The bridge portion 110 is provided with a suitable weatherstripping element 86', the back edge of which is in contact with the flange portion 118. The weatherstripping element 86' extends across the windows 82 and 85.

The inner wall portion 112 extends above the top surface of the roof 34' so as to form a lip or barrier 88' which performs the same function as the barrier 88 described in connection with FIGURE 4.

The front and rear edges of the roof panel 34' has a downwardly extending flange 52' which terminates in an outwardly extending flange 54' as illustrated in FIGURE 8. The strut 40 is extruded in one piece from suitable metal or metal alloys such as aluminum, aluminum alloy or like material which have the suitable structural characteristics necessary to perform the desired supporting functions. The tubular strut 40 includes an inner wall portion 124 abutting the flange 52' and also is provided with a wall portion 126 overlying and abutting the flange 54' as best illustrated in FIGURE 8. The tubular strut 40 is assembled with the roof panel 34' with the outer surfaces of each being substantially flush to permit water to drain off the roof panel 34' as described previously in connection with the embodiment in FIGURE 5. A plurality of threaded fasteners 128 connect each front or rear edge of the head lining 74' with the corresponding flange 54' of the roof panel 34' and the wall portion 126 of the tubular strut 40. The tubular strut 40 includes a laterally extending element 130 which carries a suitable weatherstrip or sealing elements 98' for the windshield 16.

It should also be noted that in FIGURE 4 and in FIGURE 9 the flange 64 and bridge portion 110 respectively overhang the windows in the side of the vehicle body.

From the foregoing it should be realized that the roof panel may be formed with various flanges utilizing conventional and relatively simple dies without requiring special dies and fixtures therefor as required by prior art vehicle bodies. In addition, drip moldings as separate elements have been eliminated. Thus the roof of a vehicle body can be constructed in a more economical manner than heretofore and is easier to manufacture and assemble.

The drawings and the foregoing specification constitute a description of the improved roof construction for a motor vehicle in such full, clear, concise and exact terms as to enable any person skilled in the art to practice the invention, the scope of which is indicated by the appended claims.

What I claim as my invention is:

1. A body for a motor vehicle comprising upper and lower portions enclosing the passenger space of the vehicle, said portions including a roof panel, a pair of laterally spaced side struts located generally in vertical planes, each of said side struts extending from the intersection of said upper and lower portions at the front of and at one side of the vehicle in a generally upwardly and then rearwardly direction towards the rear of the vehicle and finally in a generally downwardly direction to the intersection of said upper and lower portions at the rear of the vehicle, said roof panel being generally rectangular and slightly curved in the longitudinal and transverse directions, each edge of said roof panel having a downwardly extending flange, front and rear transversely extending struts connecting portions of said side struts intermediate the ends thereof, said side, front and rear struts each having a wall portion in contact with the correspoding flange on the roof panel, means for securing said flanges and wall portions together, the outer surfaces of the struts at the side edges of said roof panel extending upwardly beyond the top surface of said roof panel to form barriers which generally prevents rain water from falling off the roof transversely thereof, and the top surfaces of said front and rear struts being substantially flush with the top surface of the roof panel to permit rain water from the roof panel to escape.

2. The structure defined in claim 1 wherein said securing means is in the form of a weld.

3. The structure defined in claim 1 wherein said securing means is in the form of threaded fasteners.

4. The structure defined in claim 1 wherein each of said struts is in the form of an integral one-piece extruded member which is secured to the corresponding flange of the roof panel by threaded fasteners.

5. The structure defined in claim 1 wherein each of said struts is in the form of a two-piece construction having an outer rail overlying an inner rail, with each of said rails having a flange in superimposed relationship with the corresponding flange of the roof panel and secured thereto by welds.

6. The structure defined in claim 1 wherein conduits are provided at the leading ends of said laterally spaced side struts, said conduits extending through the front of the vehicle body whereby water from the roof may escape to the ground via the conduits.

7. A roof construction for the body of a motor vehicle comprising a generally rectangular roof panel which is curved slightly in longitudinal and transverse directions, said roof panel having downwardly extending flanges at the two side, front and rear edges thereof, a tubular strut for each edge of said roof panel, each tubular strut having a wall portion arranged in juxtaposed relationship with corresponding flange on said roof panel, means for securing the corresponding flanges and wall portions together, the outer surfaces of said tubular struts at the side edges of said roof panel extending upwardly beyond the top surface of said roof panel to form barriers which generally prevent rain water from falling off the roof transversely thereof, and the top surfaces of the tubular struts at the front and rear edges of said roof panel being substantially flush with the top surface of said roof panel to permit rain water from the roof panel to escape.

References Cited

UNITED STATES PATENTS

| | | | |
|---|---|---|---|
| 2,576,354 | 11/1951 | Oswald | 296—137 |
| 2,991,121 | 7/1961 | Barenyi | 296—137 |
| 3,008,760 | 11/1961 | Barenyi | 296—137 |

FOREIGN PATENTS 1,320,081  1/1963  France.

BENJAMIN HERSH, *Primary Examiner.*

C. C. PARSONS, *Assistant Examiner.*